US011247736B2

(12) United States Patent
Bradley et al.

(10) Patent No.: US 11,247,736 B2
(45) Date of Patent: Feb. 15, 2022

(54) TRAILER FAIRING CORNER FOR IMPROVED AERODYNAMIC PERFORMANCE

(71) Applicant: Compagnie Generale des Etablissements Michelin, Clermont-Ferrand (FR)

(72) Inventors: Calvin Rhett Bradley, Greenville, SC (US); Justin Kane Morgan, Anderson, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 20 days.

(21) Appl. No.: 16/976,183

(22) PCT Filed: Mar. 1, 2019

(86) PCT No.: PCT/US2019/020361
§ 371 (c)(1),
(2) Date: Aug. 27, 2020

(87) PCT Pub. No.: WO2019/169305
PCT Pub. Date: Sep. 6, 2019

(65) Prior Publication Data
US 2020/0406987 A1 Dec. 31, 2020

Related U.S. Application Data

(63) Continuation of application No. PCT/US2018/020714, filed on Mar. 2, 2018.

(51) Int. Cl.
*B62D 35/00* (2006.01)
(52) U.S. Cl.
CPC ................. *B62D 35/001* (2013.01)

(58) Field of Classification Search
CPC ...................................... B62D 35/00
See application file for complete search history.

(56) References Cited

U.S. PATENT DOCUMENTS

| 3,960,402 A | 6/1976 | Keck |
| 3,999,797 A | 12/1976 | Kirsch |

(Continued)

FOREIGN PATENT DOCUMENTS

| EP | 3284662 A1 | 2/2018 | |
| GB | 2074107 A | * 10/1981 | ........... B62D 35/001 |

(Continued)

OTHER PUBLICATIONS

European Patent Office; International Search Report and Written Opinion for patent application PCT/US2019/020361, filed Mar. 1, 2019; Publisher: European Patent Office, Rijswijk, Netherlands; dated May 28, 2019; pp. 1-12, enclosed.

(Continued)

*Primary Examiner* — Lori L Lyjak
(74) *Attorney, Agent, or Firm* — Neal P. Pieroti

(57) ABSTRACT

An apparatus for a trailer is provided that has a top fairing configured for being mounted to a top surface of the trailer. The trailer has a longitudinal direction, a lateral direction, and a vertical direction. A side fairing is present and is configured for being mounted to a side surface of the trailer. A corner at the side fairing and the top fairing has an outer surface with a first location and a second location. The first location is located forward of the second location in the longitudinal direction, and the first location has a radius of curvature that is smaller than a radius of curvature of the second location. The top and side fairings are configured for being mounted at locations closer to the back of the trailer than to the front of the trailer.

16 Claims, 8 Drawing Sheets

(56) References Cited

U.S. PATENT DOCUMENTS

| | | | | |
|---|---|---|---|---|
| 4,022,508 | A | * 5/1977 | Kirsch | ............... B62D 35/00 296/180.4 |
| 5,240,306 | A | 8/1993 | Flemming | |
| 5,280,990 | A | 1/1994 | Rinard | |
| 5,564,750 | A | 10/1996 | Bajorek | |
| 6,959,958 | B2 | 11/2005 | Basford | |
| 7,497,502 | B2 | 3/2009 | Wood | |
| 7,578,541 | B2 | 8/2009 | Layfield | |
| 8,251,436 | B2 | 8/2012 | Henderson | |
| 8,684,447 | B2 | 4/2014 | Henderson | |
| 8,783,757 | B2 | 7/2014 | Henderson | |
| 8,899,660 | B1 | 12/2014 | Praskovskaya | |
| 9,457,847 | B2 | 10/2016 | Smith | |
| 9,637,184 | B1 | 5/2017 | Bennett | |
| 2009/0189414 | A1 | 7/2009 | Boivin | |
| 2009/0236872 | A1 | 9/2009 | Wood | |
| 2010/0164249 | A1 | 7/2010 | Nusbaum | |
| 2010/0264690 | A1 | 10/2010 | Brown | |
| 2011/0062749 | A1 | 3/2011 | Graham | |
| 2015/0197291 | A1 | 7/2015 | Roush | |
| 2015/0259014 | A1 | 9/2015 | Baker | |
| 2017/0029044 | A1 | 2/2017 | Senatro | |

FOREIGN PATENT DOCUMENTS

| | | |
|---|---|---|
| GB | 2511871 A | 9/2014 |
| JP | 2013052762 A | 3/2013 |
| KR | 20110036969 A | 4/2011 |
| WO | 2004062953 A2 | 7/2004 |
| WO | 2011034535 A1 | 3/2011 |
| WO | 2012099569 A1 | 7/2012 |
| WO | 2014074536 A1 | 5/2014 |
| WO | 2014162158 A2 | 10/2014 |
| WO | 2016083997 A1 | 6/2016 |

OTHER PUBLICATIONS

European Patent Office; International Search Report and Written Opinion for patent application PCT/US2018/020714, filed Mar. 2, 2018; Publisher: European Patent Office, Rijswijk, Netherlands; dated Oct. 31, 2018, pp. 1-14, enclosed.

* cited by examiner

TRAILER FAIRING CORNER FOR IMPROVED AERODYNAMIC PERFORMANCE

CROSS-REFERENCE TO RELATED APPLICATIONS

The present application is a 35 U.S.C. § 371 application of PCT/US19/20361 filed on Mar. 1, 2019 and entitled "Trailer Fairing Corner for Improved Aerodynamic Performance." PCT/US19/20361 claims the benefit of PCT/US18/20714 filed on Mar. 2, 2018 and entitled "Trailer Fairing Corner for Improved Aerodynamic Performance." PCT/US19/20361 and PCT/US18/20714 are both incorporated by reference herein in their entireties for all purposes.

FIELD OF THE INVENTION

The subject matter of the present invention relates to an end of trailer fairing that improves aerodynamic performance of the trailer. More particularly, the present application involves an end of trailer fairing that features a top fairing in contact with a side fairing their engagement forming a rounded corner with different radii of curvature at different locations along its longitudinal length.

BACKGROUND OF THE INVENTION

Trailers towed by trucks and similar apparatuses for transporting cargo can be large, unwieldy, and include geometries which invite inefficiencies during travel. One aspect of these inefficiencies concerns the aerodynamics of the trailer. For maximum capacity, the trailer is box shaped which is not the most aerodynamically available option. Further, the rear door of the trailer is made in a particular manner to facilitate loading and unloading, such as utilizing a large opening, and the rear door may not have optimal aerodynamic properties. In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced and permits the trailer to be towed more efficiently, increasing the gas mileage and performance of the vehicle and its cargo. Other ways of improving aerodynamic performance of the trailer involves the provision of fairings to the end of the trailer. The fairings modify the airflow around or off of the end of the trailer to reduce drag. It is known to produce fairings that have a curved outer surface that extend from the leading edge of the fairing to the tailing edge of the fairing. These curved fairings change the airflow about the end of the trailer to reduce dragging force. However, prior fairings are not continuous from the side fairings to the top fairings and leave gaps between them which could cause an increase in aerodynamic drag. The box like structure of the trailer may result in rotational flow of air at the back corners of the trailer called vortexes which require energy of formation. Their reduction of size or intensity can lead to reduced aerodynamic drag. Although capable of reducing some dragging force at the end of the trailer, additional fairing designs that can stabilize the airflow wake structure behind the trailer are desirable. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
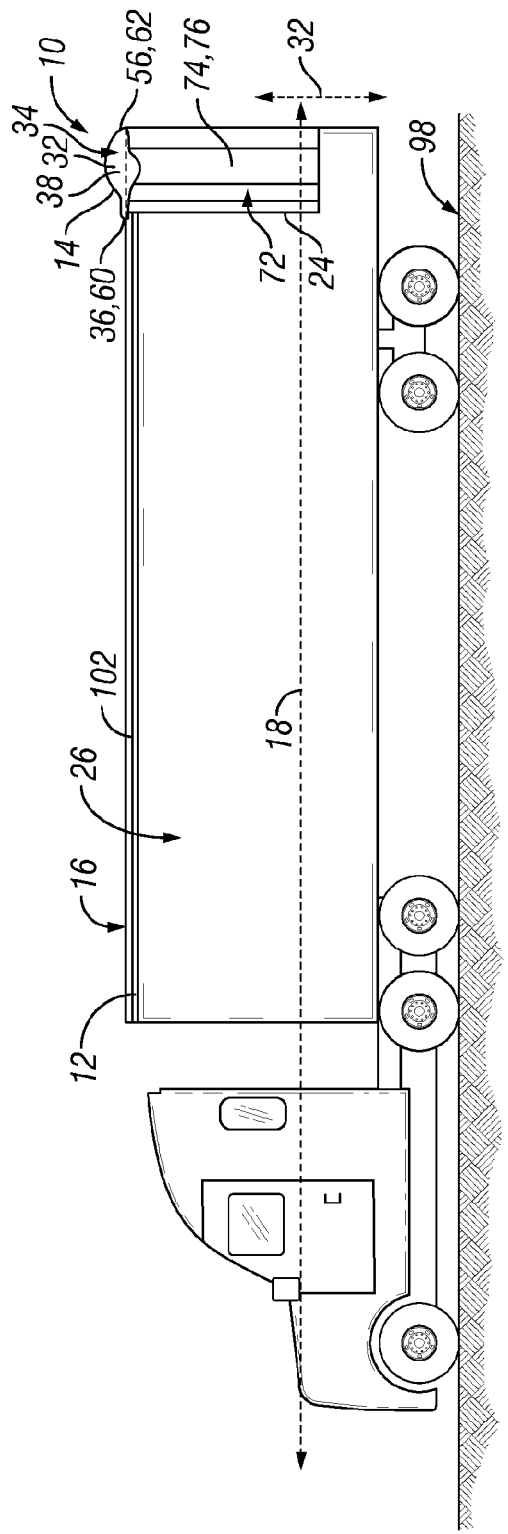
FIG. 1 is a side view of a tractor and a trailer using the disclosed apparatus.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that has a top fairing 14 and a side fairing 24 for use in increasing aerodynamic performance of a trailer 12 carried by a tractor. The apparatus 10 features a corner 32 at the intersection of the top and side fairings 14, 24 that has a convex shaped outer surface 34. A forward location 36 of the outer surface 34 has a smaller radius of curvature 40 than a radius of curvature 42 of a more rearward location 38 on the outer surface 34. The convex design of the outer surface 34 achieves a more aerodynamic performance for the trailer 12 in normal use, and this curved outer surface 34 may extend in some instances along the entire length of the corner 32 in the longitudinal direction 18.

Figure 2:
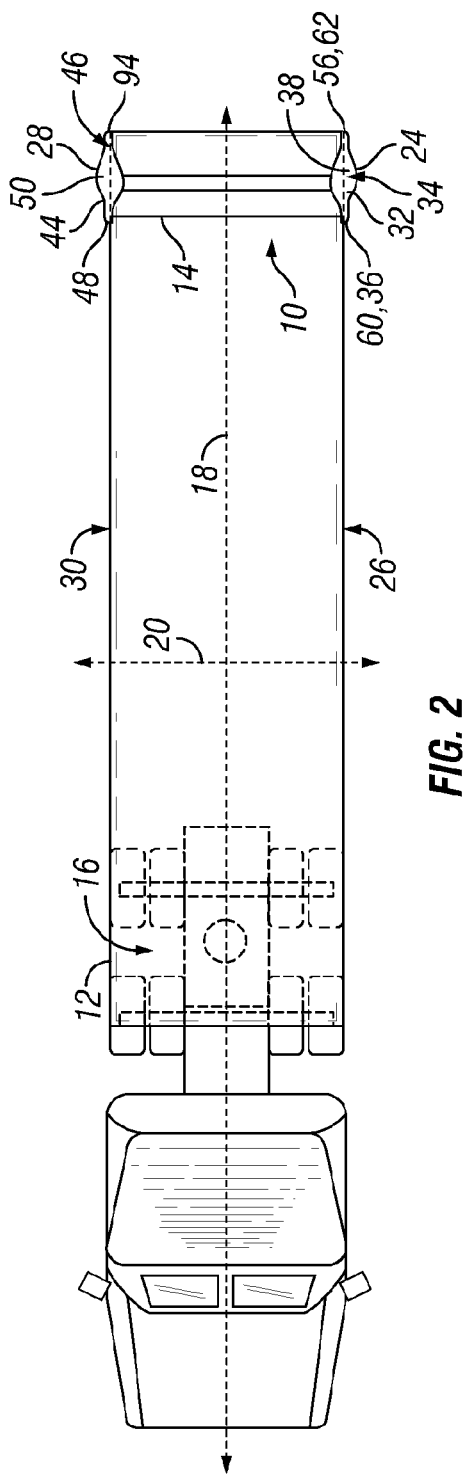
FIG. 2 is a top view of the tractor, trailer, and apparatus of FIG. 1.
Figure 5:
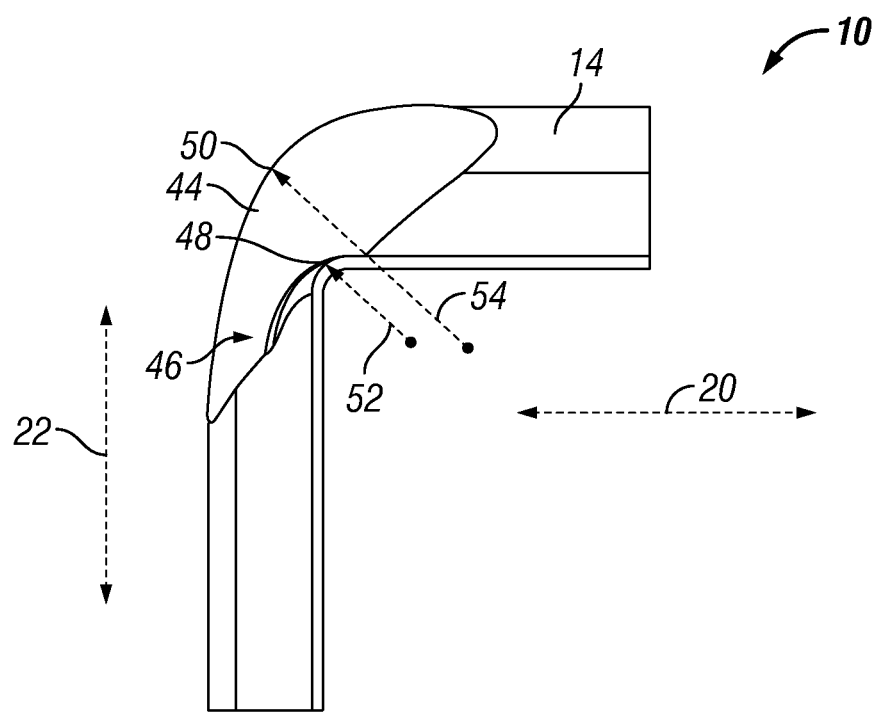
FIG. 5 is a front view of FIG. 3.
Figure 6:
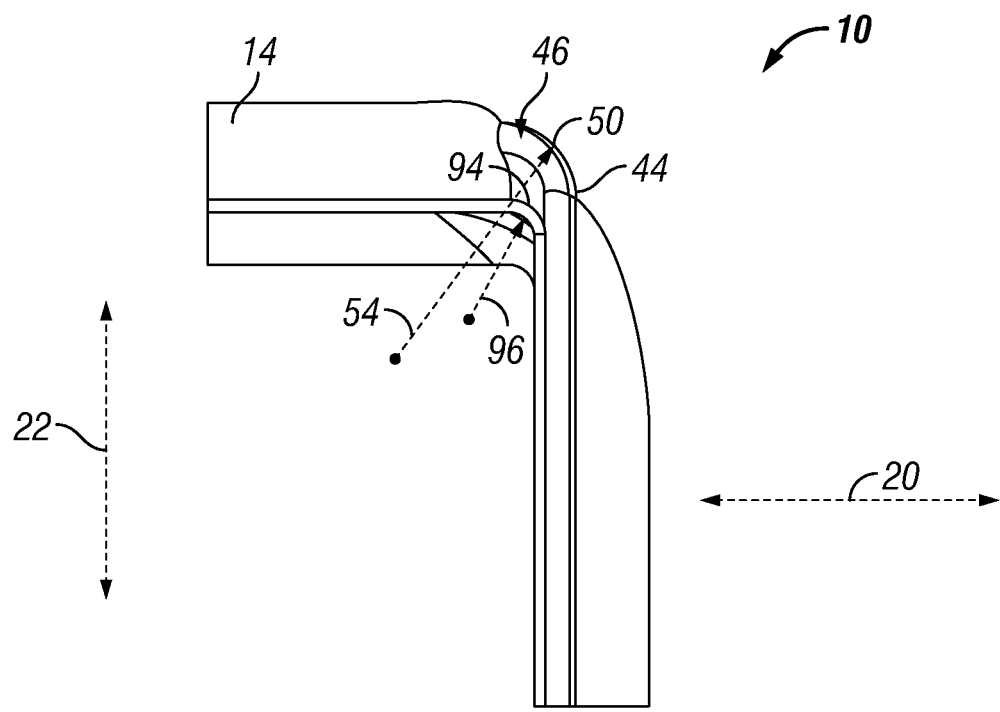
FIG. 6 is a back view of FIG. 3.

FIGS. 1 and 2 illustrate one embodiment of the apparatus 10 in which it is carried by a trailer 12. The apparatus 10 features a pair of side fairings 24, 28 on the side surfaces 26, 30 of the trailer 12 that each engage a top fairing 14 on the top surface 16 of the trailer 12. The apparatus 10 is located closer to the back end of the trailer 12 than the front end of the trailer 12 in the longitudinal direction 18, and in some instances may be located at the back end of the trailer 12.

The fairings 14, 24, 28 can be shaped with curved or angled outer surfaces for aerodynamic performance when the trailer 12 is moved forward by the tractor. A corner 32 is located at the intersection of the first side fairing 24 and the top fairing 14, and a second corner 44 is located at the intersection of the top fairing 14 and the second side fairing 28. These corners 32, 44 have convex outer surfaces 34, 46 along all of or a part of their lengths in the longitudinal direction 18. The top fairing 14 extends across the entire width of the top surface 16 in the lateral direction 20. The side fairings 24, 28 extend along a majority of, but not all of, the height of the side surfaces 26, 30 in the vertical direction 22. In some instances, the side fairings 24, 28 may extend the entire height of the side surfaces 26, 30 in the vertical direction 22. The first corner 32 may be described as being part of the first side fairing 26, or a part of the top fairing 14, or a piece of both of fairings 14 and 26, or may be described as a completely separate piece of the apparatus 10 from the first side fairing 26 and the top fairing 14. Likewise, the second corner 44 may be a portion of the second side fairing 28, a part of the top fairing 14, a piece of both of the top fairing 14 and the second side fairing 28, or may be a completely separate component from the top fairing 14 and the second side fairing 28. The fairings 14, 24, 28 are structures that can be curved panels that attach at a leading edge to the top surface 16 and side surfaces 26, 30 in such a way that the fairings 14, 24, 28 curve or otherwise extend away from the surface 16, 26, 30 in question and then curve or otherwise extend back to the surface 16, 26, 30 in question. This extension away from and then back to can be viewed in the forward to rearward direction in the longitudinal direction 18.

The apparatus 10 may be a single integral piece, or the various portions of the apparatus 10 such as the side fairings 24, 28, top fairing 14, and corners 32, 44 can be made of any number of components. The portions of the apparatus 10 can be attachable to the trailer 12 via brackets, screws, bolts, welding, mechanical fasteners, or other mechanical means. The trailer 12 and the tractor rest on the ground 98 in normal use, and travel forward in the longitudinal direction 18 in normal use, but may also back up and travel backwards in the longitudinal direction 18 in some instances but this direction of travel is much less than the forward direction and the trailers 12 are not aerodynamically designed for such travel direction.

The second corner 44 is shown in FIGS. 3-6 along with sections of the top fairing 14 and the second side fairing 28 that meet at the second corner 44. The top fairing 14 and the second side fairing 28 can be different in size and may have upper surfaces that have different curvatures and geometries from one another. As such, the intersection of the upper surfaces of the top fairing 14 and the second side fairing 28 can result in the corner 44 having a complex geometry. The second outer surface 46 may have a convex shape, and a first location 48 of the second outer surface 46 can be located at the forward most point of the second outer surface 46 in the longitudinal direction 18. A second location 50 of the second outer surface 46 is located rearward of the first location 48 in the longitudinal direction 18. The second location 50 can in some instances be located at the midpoint of the second outer surface 46 in the longitudinal direction 18. The second outer surface 46 is convex in shape at both locations 48, 50. The radius of curvature 52 of the first location 48 is smaller than the radius of curvature 54 of the second location 50. The second outer surface 46 can have a radius of curvature that constantly increases from the first to second locations 48, 50 in the longitudinal direction 18, or may have a radius of curvature that does not decrease at any point from the first location 48 to the second location 50 in the longitudinal direction 18.

A third location 94 of the second outer surface 46 is located rearward of both the first location 48 and the second location 50 in the longitudinal direction 18, and is located at the back terminal end of the second outer surface 46 in the longitudinal direction 18. The third location 94 has a radius of curvature 96 that is less than the radius of curvature 54. In some instances, the radius of curvature 96 can be the same as the radius of curvature 52. The radius of curvature of the second outer surface 46 may decrease at a constant rate from the second location 50 to the third location 94 in the longitudinal direction 18, or may not have any increases from the second location 50 to the third location 94 in the longitudinal direction 18. The second outer surface 46 need not have a symmetrical shape about its length in the longitudinal direction 18, and may have its greatest radius of curvature at positions other than its midpoint in the longitudinal direction 18 due to the geometries of the fairings 14, 28. The first, second and third locations 48, 50, 94 are located at different positions in the vertical direction 22. The entire second outer surface 46 may have a portion that is convex in shape at all points from the forward terminal end to the rearward terminal end in the longitudinal direction 18. However, some sections of the second outer surface 46 may be flat in some designs. In some embodiments, the radii of curvature 52 and 96 are each 0.20 inches, and the radius of curvature 54 is 5.0 inches.

Although described as being convex in shape along its entire length in the longitudinal direction 18, the second outer surface 46 may have flat portions, angled portions, or concave portions in other designs. Further, the top fairing 16 and the side fairing 28 need not contact one another at all points along their lengths in the longitudinal direction 18. For instance, the top fairing 14 may be longer and may have a portion that sits forward of the side fairing 28 in the longitudinal direction 18 and this portion need not be connected to the side fairing 28. Even in instances in which they share the same length in the longitudinal direction 18, there can be some locations in which the top fairing 14 does not engage the side fairing 28, and the corner 44 need not be present. The corner 44 should be arranged so that at least at some location a sharp 90 degree bend is not present. The apparatus 10 may extend all the way to the back terminal end of the surfaces 26, 30, and 16 in the longitudinal direction 18, or may extend up to 2 inches rearward of these surfaces 26, 30, 16 in the longitudinal direction 18. If the apparatus extends off the back end, then the radius 96 at the back end of the corner 44 does not have to be as small as the radius 52 at the front of the corner 44. The size of the radii 96, 54, 52 may be driven by the thickness of the fairings 16, 28 such that at the same positions in the longitudinal direction 18 if the fairings 14, 28 meeting are thin then the radii are small, and if the meeting fairings 14, 28 are thick at the same positions in the longitudinal direction 18 then the radii will be large.

Figure 7:
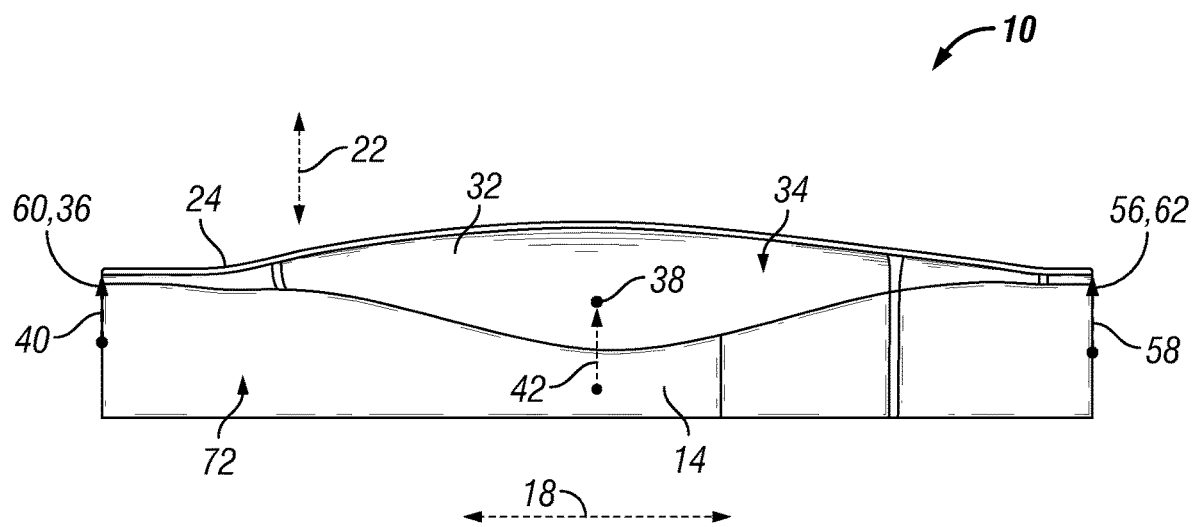
FIG. 7 is a top view of a corner of the apparatus configured to be located on the left hand side of the trailer.
Figure 4:
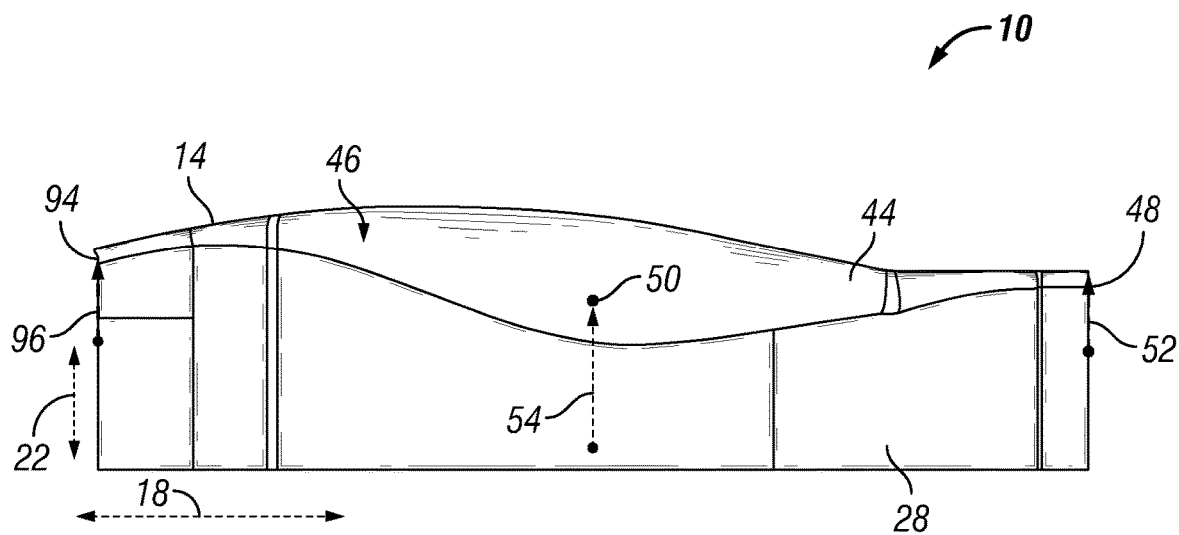
FIG. 4 is a side view of FIG. 3.
Figure 3:
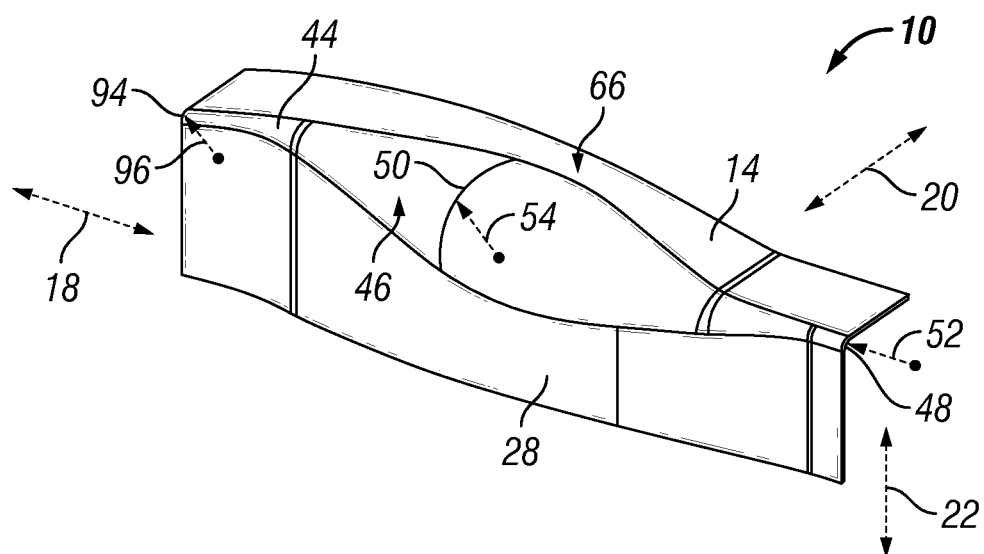
FIG. 3 is a perspective view of a corner of the apparatus configured to be located on the right hand side of the trailer.

The second corner 44 may be located on the right hand side of the trailer 12. The first corner 32 could be located on the left hand side of the trailer 12 and a top view of the first corner 32 is shown in FIG. 7. The first corner 32 is located at the intersection of the first side faring 24 and the top fairing 14 such that the apparatus 10 is continuous from the first side fairing 24 to the top fairing 14. The first corner 32 could be said to be a portion of the first side fairing 24, or a part of the top fairing 14, or a portion of both the top fairing 14 and the first side fairing 24, or may be said to be a separate component from the top fairing 14 and the first side fairing 24. A first location 36 is located forward of a second location 38 on the outer surface 34 and has a radius of curvature 40 that is less than the radius of curvature 42 at the second location 38. A third location 56 on the outer surface 34 is located rearward of both the first location 36 and the second location 38 and has a radius of curvature 58 that is less than that of the second location 38. In some instances, the first location 36 is located at the terminal leading location 60 of the corner 32 in the longitudinal direction 18, and the third location 56 is located at the terminal trailing location 62 of the corner 32 in the longitudinal direction 18. The construction and relationships of the various portions of the first corner 32 such as the locations 36, 38, 56 and the radii of curvature 40, 42, 58, and the outer surface 34 can be the same as that previously described with respect to their counterparts of the second corner 44 and a repeat of this information is not necessary. The shape of the corners 32, 44 can be the same as one another or different from one another in accordance with different exemplary embodiments.

Figure 8:
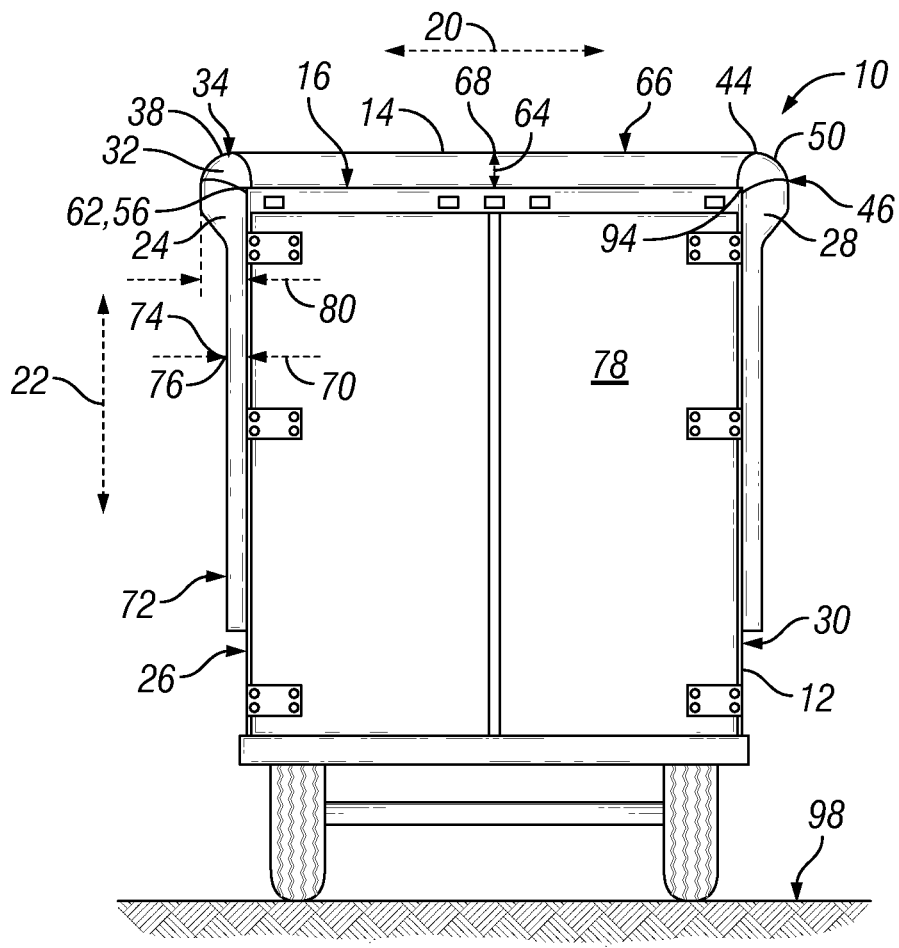
FIG. 8 is a back view of the trailer with the apparatus located thereon.

FIG. 8 is a back view of the apparatus 10 attached to a trailer 12. The top fairing 14 has a height 64 that extends from the top surface 16 to the outer surface 66 of the top fairing 14 in the vertical direction 22. The side fairing 24 has an outer surface 72 and a width 70 that extends in the lateral direction 20 from the first side surface 26 to the outer surface 72. The outer surface 72 has an outer terminal point 74 and the width 70 is measured from the first side fairing 26 to the outer terminal point 74. The top fairing 14 may be larger than the side fairing 24 in that the magnitude of the height 64 is greater than the magnitude of the width 70. In other versions of the apparatus 10, the magnitude of the height 64 can be the same as or smaller than the magnitude of the width 70. The second side fairing 28 may be arranged in a similar manner as the first side fairing 24 as previously discussed in relation to the top fairing 14 and a repeat of this information is not necessary. The top surface 16 is a panel that covers the cargo area of the trailer 12. The top surface 16 near the back door 78 may have a rain gutter located thereon which would be an indentation on the top surface 16 that extends downward in the vertical direction 22. Other structural elements could be present at or on the top surface 16 near the back end. When describing the heights of the top fairings 14 and discussion of the associated top surfaces 16, it is to be understood that the heights are measured from the panel section of the top surface 16 and not from the rain gutters or other structural elements at or on the top surface 16.

The side fairing 24 can be arranged so that it has a greater width proximate to the corner 32 than at other portions of the side fairing 24. A midpoint of height 76 is noted in FIG. 8 and is located at the midpoint of the height of the side fairing 24 in the vertical direction 22. The portion of the side fairing 24 proximate to, at, or engaging the corner 32 has a width 80 in the lateral direction 20. The width 80 is the distance from the first side surface 26 to the outer surface 72 in the lateral direction 20 at the location proximate to, at, or engaging the corner 32. The width 80 is greater than the width 74. This may be due to the fact that the top fairing 14 is larger than the side fairing 24 and the side fairing 24 must increase in size in order to blend in smoothly with the top fairing 14 at the corner 32. The increase in size of the side fairing 24 may take place at a location higher than the upper terminal end of the back door 78 of the trailer 12 in the vertical direction 22 to avoid interfering with the back door 78 when the back door 78 is opened. The increased width 80 can be located completely above the height of the back door 78 in the vertical direction 22. The smaller width 70 of the side fairing 24 can be located in the vertical direction 22 at the same locations as the presence of the back door 78 in the vertical direction 22. The thickened or increased width 80 section of the side fairing 24 may be located at the top of the side fairing 24 and may have a height from 1 to 7 inches in the vertical direction 22 to help provide a larger radius for engagement with the top fairing 14. This thickness may return to a width 70 with a magnitude less than that of the magnitude of height 64 below the thickened section to afford opening of the back door 78.

In various embodiments, the width 70 has a magnitude that is less than the magnitude of the height 64 which in turn is less than the magnitude of the width 80. In this regard, the width 70 is measured at the outer terminal point 74 located at the midpoint of the height 76. The height 64 is measured at the upper terminal point 68 at the outer surface 66. The width 80 is measured at the corner 32 of the side fairing 24.

Figure 9:
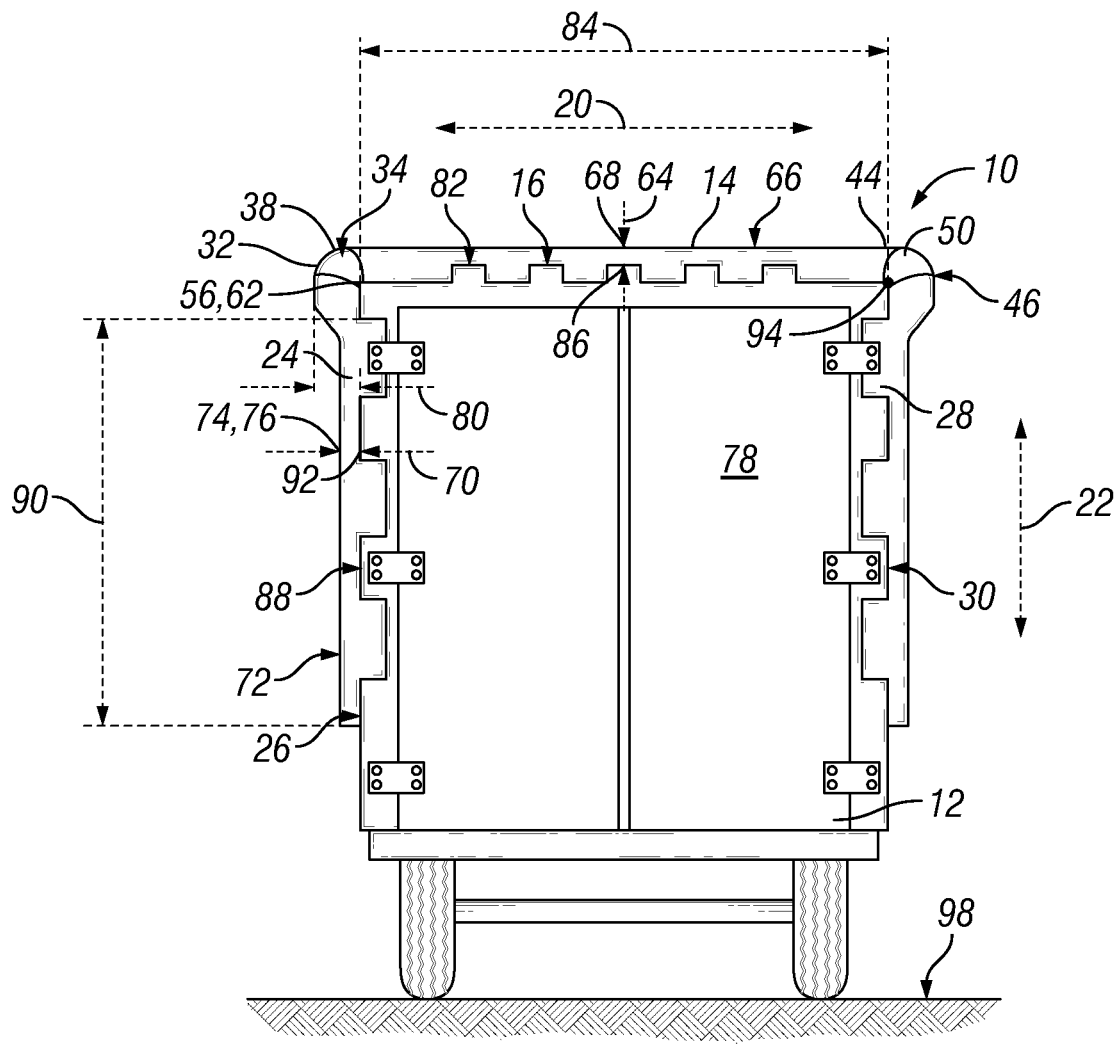
FIG. 9 is a back view of the trailer that has a top surface and side surfaces with uneven height and widths with the apparatus located thereon.

FIG. 9 shows an alternate embodiment in which the trailer 12 does not have flat side surfaces 26, 30 or a flat top surface 16 at least at locations onto which the apparatus 10 is mounted. The surfaces 26, 30, 16 could be grooved or have different areas of height/width. The area 82 of the top surface 16 engaged or covered by the top fairing 14 has a width of 84 that extends in the lateral direction 20. The top fairing 14 extends into the grooves present on the top surface 16 so as to fill them in, but in other arrangements the grooves could be completely or partially empty. A highest location 86 of the top surface 16 is the location of the top surface 16 that is highest in the vertical direction 22. There may be a single highest location 86, or there may be multiple highest locations 86 along the width 84 of the area 82. The height 64 is measured from the highest location 86 to the upper terminal point 68 of the outer surface 66 in the vertical direction 22. The side fairing 24 can be arranged in a similar manner in which an area 88 of the first side surface 26 has different inboard and outboard locations in the lateral direction 20 along an entire height 90 of the area 88. The entire height 90 is the height in the vertical direction 22 that the side fairing 24 engages or covers when the apparatus 10 is attached. One or more locations of the side surface 26 can have a maximum outboard location in the lateral direction 20, and a most outboard location 92 is located on these one or more points of the side surface 26. In FIG. 9, the most outboard location 92 also has the same positioning in the vertical direction 22 as does the midpoint of height 76, but it need not be in other arrangements. The width 70 is measured from the most outboard location 92 to the outer terminal point 74 in the lateral direction 20. The magnitude of the height 64 may be greater than the magnitude of the width 70. The magnitude of the width 80 may be greater than the magnitude of the width 70, and the magnitude of the width 80 may be greater than the magnitude of the height 64.

The corners 32, 44 take into account cross-flow of air in the lateral direction 20 that is imparted onto the trailer 12 during travel. The corners 32, 44 channel air flow coming inboard towards the trailer 12 in the lateral direction 20 in an aerodynamic fashion due to the shape and configuration of the corners 32, 44 to reduce drag on the tractor trailer 12 vehicle. The apparatus 10 may feature no moving components during use such that the top fairing 14, and the side fairings 24 and 28 do not have any components that move during normal use of the trailer. Some of the different embodiments and features were described with respect to the first corner 32 and others with respect to the second corner 44. However, it is to be understood that this was done for sake of convenience and that each one of these corners 32, 44 and their associated components may be configured as was described with respect the other one of the corners 32, 44 and associated components.

Figure 10:
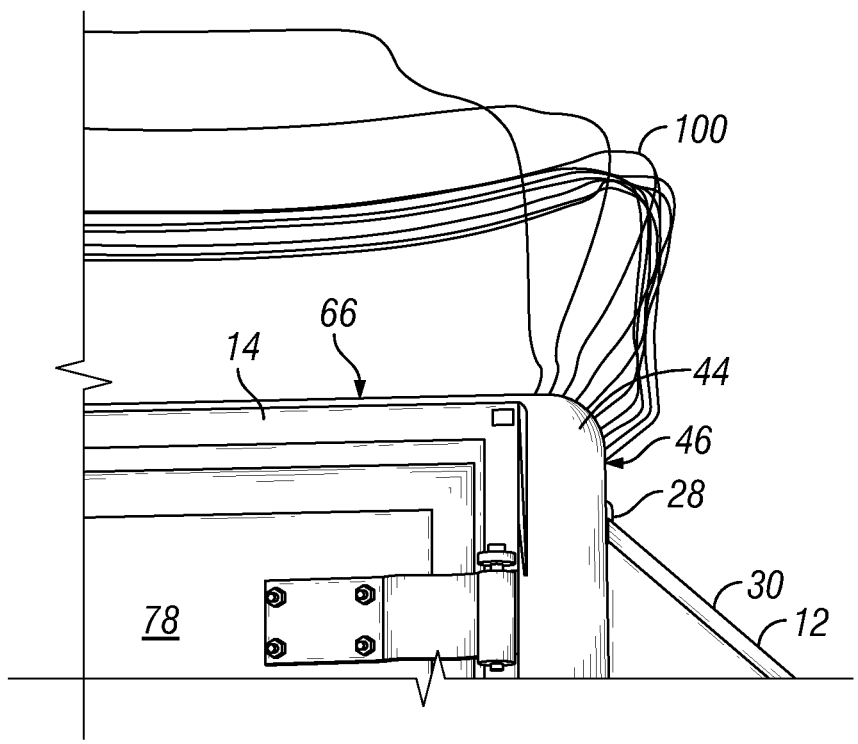
FIG. 10 is a rear perspective view showing airflow that is cross-flow across a right angled corner.

FIG. 10 is a rear perspective view of the back end of the trailer 12 in which a top fairing 14 connected to a second side fairing 28 by way of a second corner 44 is present. The second corner 44 is straight in that right angles are present between the fairings 14 and 28 such that the fairings 14, 28 meet at a right angle. The second corner 44 has sharp right angled intersections and is not rounded as described herein with the locations 48, 50, 94 having the various radii of curvature relationships. Cross-flow of airflow 100 is illustrated as observed in a computer simulation across this area of the trailer 12 and corner 44. The cross-flow may be imparted onto the trailer 12 through normal driving forces, or through wind or by the disturbance of other objects on the roadway. The airflow 100 was discovered to come off of the second corner 44 at various locations overlapping one another in that certain airflow streams were directed into other airflow streams. This overlapping of the airflow 100 creates turbulence in the aerodynamic performance of the trailer 12 and second corner 44 which would not be as desirable as if the airflow 100 did not overlap and create turbulence.

Figure 11:
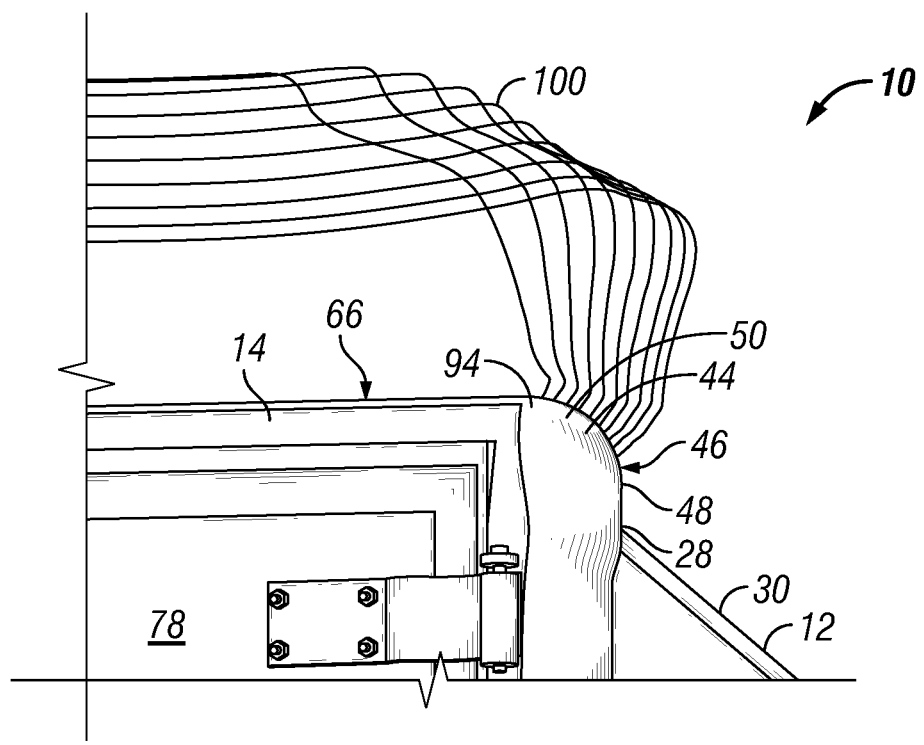
FIG. 11 is a rear perspective view showing airflow that is cross-flow over a rounded corner.

FIG. 11 is a view similar to that shown in FIG. 10 with the exception that the second corner 44 is rounded instead of arranged at a right angle. The second outer surface 46 thus has a convex shape. The second corner 44 is arranged in the manner discussed herein in that the first location 48 has a smaller radius of curvature 52 that is smaller than the radius of curvature 54 of the second location 50. The radius of curvature 96 of the third location 94 is likewise smaller than the radius of curvature 54 of the second location 50. The airflow 100 is also shown as output from a computer simulation of this trailer and second corner 44. The cross-flow produces airflow 100 that comes off of the second corner 44 as streams that do not overlap or interfere with one another and produce less turbulence than the right angle corner 44 in FIG. 10. This resulting airflow 100 increases the aerodynamic performance of the trailer 12 with the apparatus 10 as disclosed herein relative to the cross-flow of air during operations of the trailer 12.

Figure 12:
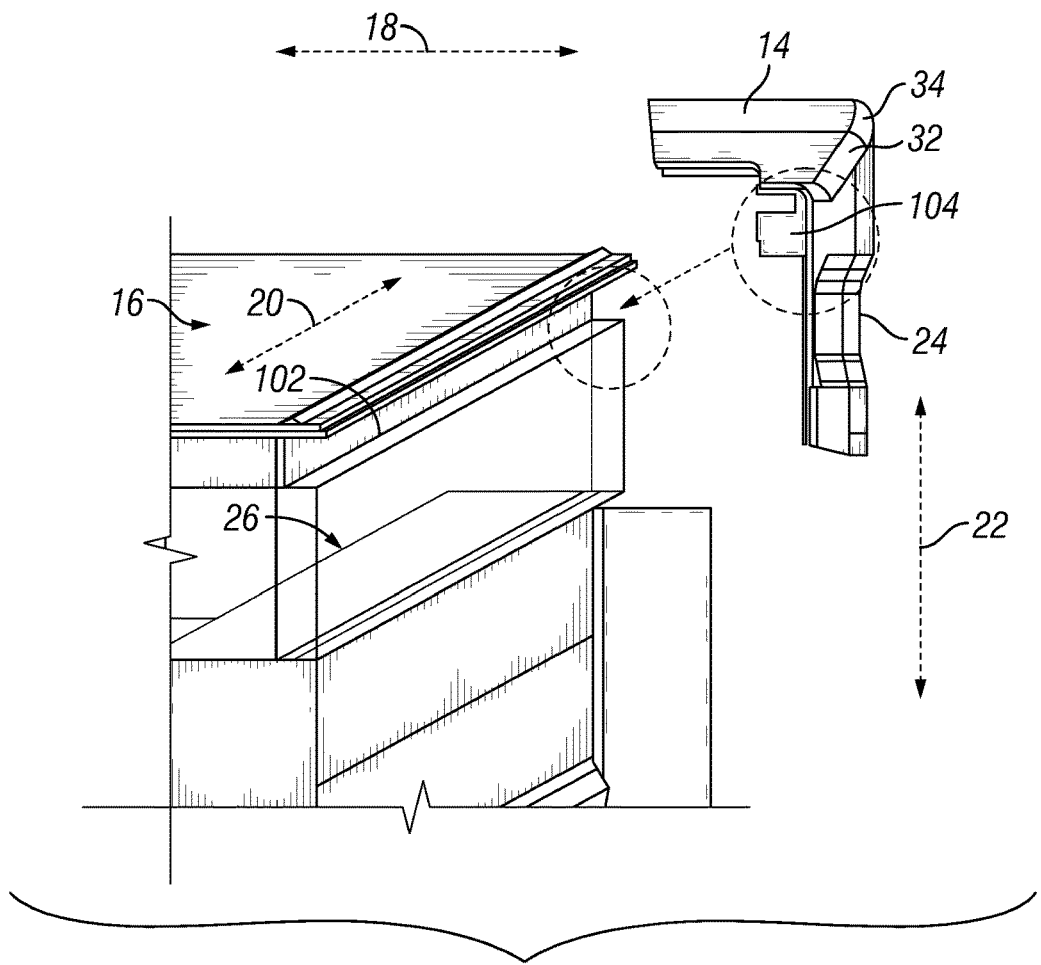
FIG. 12 is a perspective view of a portion of a trailer having a channel with a corner having an air blocking tab disassembled from the trailer.
Figure 13:
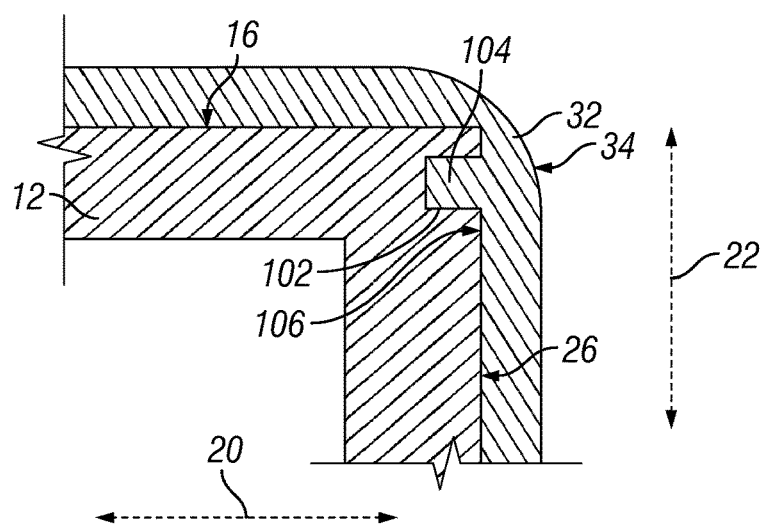
FIG. 13 is a cross-sectional view of a portion of the trailer and the corner assembled with the air blocking tab in the channel.

With reference back to FIG. 1 a channel 102 is located on the side surface 26 and extends in the longitudinal direction 18. There could be several channels on the side surface 26 on other trailers 12, and they may be present for a number of reasons, such as for example increasing the rigidity of the side surface 26. The channel 102 is shown as extending the entire length of the side surface 26 in the longitudinal direction 18, but may extend for only a portion of the longitudinal length in other instances. The channel 102 is located proximate to the top surface 16 and just below it in the vertical direction 22 and extends under the corner 32. Air flow through the channel 102 under the corner 32 will exit behind the corner 32 and fairings 14, 24 and may disrupt the air flow pattern behind the trailer 12. This disruption may not be desirable. FIGS. 12 and 13 demonstrate an alternate embodiment in which the corner 32 is provided with an air blocking tab 104 that is sized and shaped to be inserted into the channel 102. The air blocking tab 104 extends from an inner surface 106 of the corner 32. The inner surface 106 is the side of the corner 32 opposite from the outer surface 34. The air blocking tab 104 may be square shaped and may be 1.5 inches by 1.5 inches with a relatively thin thickness. The air blocking tab 104 prevents air from flowing through the channel 102 between the trailer 12 and the corner 32 to behind the trailer 12 and disrupting an air flow pattern at that location. The air blocking tab 104 may be provided so that it completely fills in the channel 102 so that all air flow through the channel 102 is blocked at this location.

Figure 14:
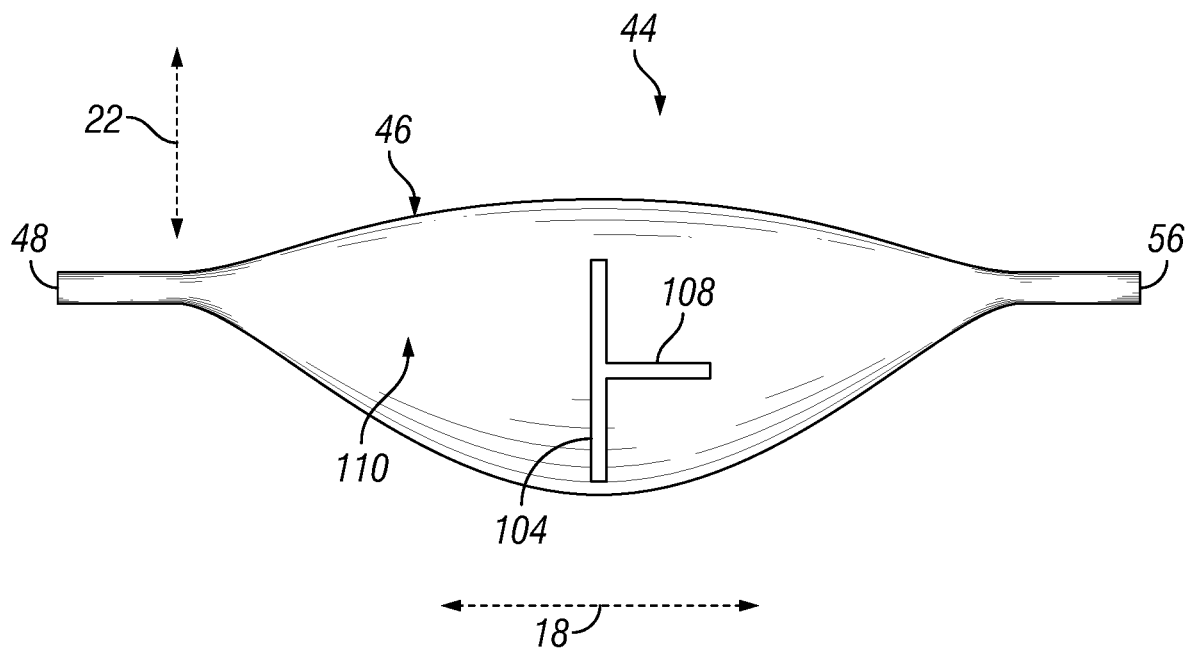
FIG. 14 is an elevation view of the back of a second corner that has an air blocking tab.
Figure 15:
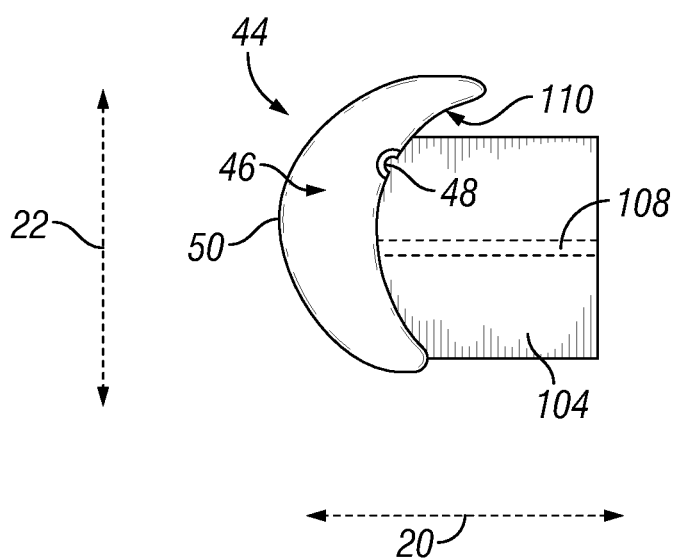
FIG. 15 is a front view of the second corner of FIG. 14.

FIGS. 14 and 15 illustrate an air blocking tab 104 on the second corner 44. The second corner 44 has an outer surface 46 and an oppositely disposed inner surface 110 that is concave in shape. The air blocking tab 104 has a relatively thin thickness when compared to the length of the corner 44 in the longitudinal direction 18. The height of the air blocking tab 104 is less than the height of the corner 44 in the vertical direction 22. The air blocking tab 104 may be positioned so that it is not at the highest or lowest vertical locations of the corner 44 in the vertical direction 22. The air blocking tab 104 is not located at the forward or rearward ends of the corner 44 but is instead located at some point between them in the longitudinal direction 18. The air blocking tab 104 extends inboard in the lateral direction 20 so that it may be located farther inboard in the lateral direction 20 than any other portion of the corner 44.

The air blocking tab 104 could be integrally formed with the corner 44, or may be a separate piece that is attached thereto. A structural support tab 108 is present and engages both the air blocking tab 104 and the inner surface 110 and provides structural support to the air blocking tab 104 to prevent or minimize deflection when air pushes against it during transport of the trailer 12. The structural support tab 108 is located rearward of the air blocking tab 104 in the longitudinal direction 18. When elements 104 and 108 are provided as plates, the structural support tab 108 is oriented at a ninety degree angle to the air blocking tab 104. Although described as only filling a portion of the channel 102, the air blocking tab 104 could in other embodiments fill the entire channel 102. The air blocking tab 104 is contained to the corner 44 and is not part of the side fairing 28 or the top fairing 14. However, in other embodiments, the side fairings 24, 28 and top fairing 14 could in fact have their own air blocking members should there be a channel in the trailer surfaces 14, 26, 30 that would allow air to flow under the fairing 14, 24, 28.

The air blocking tab 104 was described with the first corner 32 in FIGS. 12 and 13, and with the second corner 44 with reference to FIGS. 14 and 15. It is to be understood that any of the description related to the air blocking tab 104 with the first corner 32 could be applied to the air blocking tab 104 of the second corner 44. Likewise, any of the description of the air blocking tab 104 with the second corner 44 could be applied to the air blocking tab 104 of the first corner 32, thus making the description of the air blocking tab 104 and structural support tab 108 interchangeable between the two corners 32, 44. When both corners 32, 44 are present in the apparatus 10, they may both be provided with the air blocking tab 104, or only one of them may have the air blocking tab 104. Further, the configuration of the air blocking tabs 104 need not be identical between the first corner 32 and the second corner 44.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. An apparatus for a trailer, comprising:
a top fairing configured for being mounted to a top surface of the trailer at a location closer to the back of the trailer than to the front of the trailer, wherein the trailer has a longitudinal direction, a lateral direction, and a vertical direction; and
a side fairing configured for being mounted to a side surface of the trailer at a location closer to the back of the trailer than to the front of the trailer, wherein a corner at the side fairing and the top fairing has an outer surface with a first location and a second location, wherein the first location is located forward of the second location in the longitudinal direction, and wherein the first location has a radius of curvature that is smaller than a radius of curvature of the second location;
wherein the corner has an inner surface that is located opposite to the outer surface of the corner, wherein the corner has an air blocking tab that extends from the inner surface and is configured for being disposed within a channel of the trailer.

2. The apparatus as set forth in claim 1, wherein the side fairing is a first side fairing and wherein the side surface of the trailer is a first side surface of the trailer, and wherein the corner is a first corner, and further comprising:
a second side fairing configured for being mounted to a second side surface of the trailer at a location closer to the back of the trailer than to the front of the trailer, wherein a second corner at the second side fairing and the top fairing has a second outer surface with a first location and a second location, wherein the first location of the second outer surface is located forward of the second location of the second outer surface in the longitudinal direction, and wherein the first location of the second outer surface has a radius of curvature that is smaller than a radius of curvature of the second location of the second outer surface.

3. The apparatus as set forth in claim 1, wherein the outer surface of the corner has a third location that is located rearward of the first location and the second location in the longitudinal direction, wherein the radius of curvature of the second location is larger than a radius of curvature of the third location.

4. The apparatus as set forth in claim 3, wherein the radius of curvature of the third location is the same as the radius of curvature of the first location.

5. The apparatus as set forth in claim 4, wherein the radius of curvature of the first location is 0.2 inches, wherein the radius of curvature of the second location is 5.0 inches, and wherein the radius of curvature of the third location is 0.2 inches.

6. The apparatus as set forth in claim 3, wherein the third location is located at a terminal trailing location of the corner in the longitudinal direction.

7. The apparatus as set forth in claim 1, wherein the first location is located at a terminal leading location of the corner in the longitudinal direction.

8. The apparatus as set forth in claim 1, wherein the outer surface of the corner extends from a terminal leading location of the corner to a terminal trailing location of the corner in the longitudinal direction, wherein at least a portion of the outer surface of the corner is continuously curved so as to have a convex shape along an entire length of the outer surface from the terminal leading location to the terminal trailing location in the longitudinal direction.

9. The apparatus as set forth in claim 1, wherein the top fairing has a height that extends from the top surface of the trailer to the upper terminal point on an outer surface of the top fairing in the vertical direction;
wherein the side fairing has a width that extends from the side surface of the trailer to an outer terminal point on an outer surface of the side fairing in the lateral direction;
wherein a magnitude of the height of the top fairing is greater than a magnitude of the width of the side fairing.

10. The apparatus as set forth in claim 1, wherein the side fairing has a width that extends from the side surface of the trailer to an outer surface of the side fairing in the lateral direction, wherein the width of the side fairing is greater at the corner than at a location at the midpoint of the height of the side fairing in the vertical direction.

11. The apparatus as set forth in claim 10, wherein the width of the side fairing is greater above a top height of a back door of the trailer in the vertical direction than below the top height of the back door of the trailer in the vertical direction.

12. The apparatus as set forth in claim 10, wherein the top fairing has a height that extends from the top surface of the trailer to an upper terminal point on an outer surface of the top fairing in the vertical direction; wherein a magnitude of the width of the side fairing at the corner is greater than a magnitude of the height of the top fairing at the upper terminal point on the outer surface of the top fairing; and wherein a magnitude of the width of the side fairing at the midpoint of the height of the side fairing in the vertical direction is less than the magnitude of the height of the top fairing at the upper terminal point on the outer surface of the top fairing.

13. The apparatus as set forth in claim 1, wherein the top fairing engages an area of the top surface of the trailer that is not located at the same vertical location across an entire width of the area of the top surface in the lateral direction, wherein the height of the top fairing that extends from the top surface of the trailer to the upper terminal point on the outer surface of the top fairing in the vertical direction is measured from the highest location of the area of the top surface in the vertical direction.

14. The apparatus as set forth in claim 1, wherein the side fairing engages an area of the side surface of the trailer that is not located at the same lateral location across an entire height of the area of the side surface in the vertical direction, wherein the width of the side fairing that extends from the side surface of the trailer to the outer terminal point of the side fairing in the lateral direction is measured from the most outboard location of the area of the side surface in the lateral direction.

15. The apparatus as set forth in claim 1, wherein the outer surface at the first location is convex in shape, and wherein the outer surface at the second location is convex in shape, and wherein the side fairing and top fairing do not have any moving components during use.

16. The apparatus as set forth in claim 1, wherein the air blocking tab has a length in the longitudinal direction that is less than a length of the corner in the longitudinal direction, wherein the air blocking tab extends farther inboard in the lateral direction than any other portion of the corner, and further comprising a structural support tab that engages the air blocking tab and the inner surface of the corner.

* * * * *